(12) United States Patent
Glerum et al.

(10) Patent No.: US 7,219,266 B2
(45) Date of Patent: *May 15, 2007

(54) METHOD AND SYSTEM FOR CATEGORIZING FAILURES OF A PROGRAM MODULE

(75) Inventors: Kirk A. Glerum, Redmond, WA (US); Matthew J. Ruhlen, Redmond, WA (US); Eric A. LeVine, Seattle, WA (US); Rob M. Mensching, Seattle, WA (US); Charles S. Walker, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

This patent is subject to a terminal disclaimer.

(21) Appl. No.: 10/878,784

(22) Filed: Jun. 28, 2004

(65) Prior Publication Data

US 2004/0250170 A1 Dec. 9, 2004

Related U.S. Application Data

(63) Continuation of application No. 09/570,664, filed on May 15, 2000, now Pat. No. 6,785,848.

(51) Int. Cl.
G06F 11/00 (2006.01)
(52) U.S. Cl. .......................... 714/38; 717/124
(58) Field of Classification Search ................ 714/38, 714/4; 717/124, 127, 128
See application file for complete search history.

(56) References Cited

U.S. PATENT DOCUMENTS

| | | | | |
|---|---|---|---|---|
| 5,522,036 A | * | 5/1996 | Shapiro | 714/38 |
| 5,812,748 A | * | 9/1998 | Ohran et al. | 714/4 |
| 5,948,112 A | * | 9/1999 | Shimada et al. | 714/16 |
| 5,966,730 A | * | 10/1999 | Zulch | 711/162 |
| 6,161,218 A | * | 12/2000 | Taylor | 717/174 |
| 6,202,207 B1 | * | 3/2001 | Donohue | 717/173 |
| 6,357,019 B1 | * | 3/2002 | Blaisdell et al. | 714/38 |
| 6,378,087 B1 | * | 4/2002 | Flanagan et al. | 714/38 |
| 6,381,711 B1 | * | 4/2002 | Chiang et al. | 714/48 |
| 6,412,082 B1 | * | 6/2002 | Matsuura | 714/38 |
| 6,438,749 B1 | * | 8/2002 | Chamberlain | 717/174 |
| 6,629,267 B1 | * | 9/2003 | Glerum et al. | 714/38 |

* cited by examiner

*Primary Examiner*—Dieu-Minh Le
(74) *Attorney, Agent, or Firm*—Merchant & Gould P.C.

(57) ABSTRACT

A method for categorizing information regarding a failure in an application program module. The failure may be a crash, a set-up failure or an assert. For a crash, a name of an executable module where the crash occurred in the application program module, a version number of the executable module, a name of a module containing an instruction causing the crash, a version number of the module and an offset into the module with the crashing instruction are determined. This bucket information is then transmitted to a repository for storage in a database. The database may be examined to determine fixes for the bug that caused the crash.

15 Claims, 3 Drawing Sheets

| 410 | 415 | 420 | 425 | 430 | 435 | 440 | 445 | 447 | 450 | 452 |
|---|---|---|---|---|---|---|---|---|---|---|
| RESPONSE | HITS | PROD CODE | PROD VER | LAST ACTION | ERR NUM | ERR1 | ERR2 | ERR3 | .CABS WANTED | BUCKET ID |
| | 1 | 5 | 4321-23-AA | 10.3.4.1 | INSTALLED MDAC | 1034 | ABC | FAILED TO WRITE C:...\...\ | DEF | 5 | 1234 |

| RESPONSE | HITS | APPNAME | APPVER | MODULE NAM | MODVER | OFFSET | .CABS WANTED | SYMBOL | SOURCE | BUILT BY | BUCKET ID |
|---|---|---|---|---|---|---|---|---|---|---|---|
| 315 | 320 | 325 | 330 | 335 | 340 | 345 | 350 | 355 | 360 | 365 | 370 |
| 1 | 3 | WINWORD | 10.1204.1.0 | MSO.DLL | 10.124.1 | 1234 | 7 | FOOBAR.C | IF * PFOO(X) | OFFWORD 7 | 3698 |
| 1 | 1,034 | EXCEL | 10.3.4 | MSO.DLL | 10.124.1 | 1234 | 0 | FOOBAR.C | IF * PFOO(X) | OFFWORD 7 | 4701 |

| RESPONSE | HITS | PROD CODE | PROD VER | LAST ACTION | ERR NUM | ERR1 | ERR2 | ERR3 | .CABS WANTED | BUCKET ID |
|---|---|---|---|---|---|---|---|---|---|---|
| 410 | 415 | 420 | 425 | 430 | 435 | 440 | 445 | 447 | 450 | 452 |
| 1 | 5 | 4321-23-AA | 10.3.4.1 | INSTALLED MDAC | 1034 | ABC | FAILED TO WRITE C...\... | DEF | 5 | 1234 |

← 405
400

METHOD AND SYSTEM FOR CATEGORIZING FAILURES OF A PROGRAM MODULE

RELATED APPLICATION

This utility patent application is a continuation of and claims the benefit under 35 United States Code §120 of Ser. No. 09/570,664, filed May 15, 2000, now U.S. Pat. No. 6,785,848 issued Aug. 31, 2004, the disclosures of which are expressly incorporated by reference.

TECHNICAL FIELD

This invention relates to software program modules. More particularly, this invention relates to a method and system for categorizing failures of a program module for transmission to a repository for storage and analysis.

BACKGROUND OF THE INVENTION

Despite the best efforts of software developers, software programs inevitably fail at one time or another. One type of failure is a crash. A crash occurs while a program module is running and results in the suspension of operation of the program module. Crashes are frustrating to users and, in some cases, may cause the user to lose work. Another type of software program failure is a set-up failure. Set-up failures occur during installation of a program module onto a user's computer. Set-up failures may prevent certain aspects of the program module, or even the entire program module, from being installed on a user's computer.

Crashes and set-up failures create a significant amount of work for product support personnel. Product support personnel, typically contacted via telephone, are often limited in their ability to diagnose problems due to the limited amount of information they can receive from the user. For example, the product support personnel may only know what the user was doing when the crash occurred or at what point of the installation the set-up failure occurred. There may be a significant amount of information on the user's computer that may be useful to the product support personnel or to the software developers to diagnose the failures. However, because product support personnel and the software developers are not physically present at the user's computer, this information can not be extracted and analyzed.

Thus, there is a need for a method and system for extracting from a computer relevant information regarding a failure of a program module, including the location of the failure, and transmitting this information to a software manufacturer so, that the failure may be diagnosed and corrected. There is also a need for a method and system for requesting information from a failed program module, in addition to the location of the failure, and transmitting this additional information to a central repository for storage and analysis.

In developing such a method and system for reporting failures in a program module, there is a need for a method and system for categorizing failures to differentiate between separate failures. One way to differentiate between separate failures is to transmit and analyze massive amounts of data regarding a failure. However, sending massive amounts of data regarding a failure to a server is extremely inefficient and virtually impossible. For example, it is important that a lot of failure data not be transmitted to the server because many users will transmit the data via modems, etc. taking a lot of time to upload. Thus, there is a need for a method and system for categorizing failures using a minimal amount of uploadable data, while still differentiating between separate failures.

SUMMARY OF THE INVENTION

The present invention satisfies the above described needs by providing a method and system for categorizing failures of a program module.

In one aspect, the invention comprises a computer-implemented method and system for categorizing information regarding a failure in an application program module. The failure may be a crash, a set-up failure or an assert.

In one aspect of the invention, for a crash, a name of an executable module where the crash occurred in the application program module, a version number of the executable module, a name of a module containing an instruction causing the crash, a version number of the module and an offset into the module with the crashing instruction are determined. This bucket information is then transmitted to a repository for storage in a database. The database may be examined to determine fixes for the bug that caused the crash.

In another aspect, for a set-up failure, a product code of the application program module that was being installed at the time of the set-up failure is determined. A product version of the application program module that was being installed at the time of the set-up failure is determined. The final set-up action that was performed during set-up before the failure is determined. An internal error number assigned to the failure that occurred is determined. ErrorFields 1 2, and 3 are determined. These error fields are defined by the particular error number. The product code, product version, final set-up action, error number and error fields define a bucket that may be sent to a repository for storage.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIG. 3 is an illustration of an exemplary crash database and exemplary crash bucket entries in accordance with an embodiment of the present invention.

FIG. 4 is an illustration of an exemplary set-up failure database and an exemplary set-up failure bucket entry in accordance with an embodiment of the present invention.

DETAILED DESCRIPTION

Figure 1:
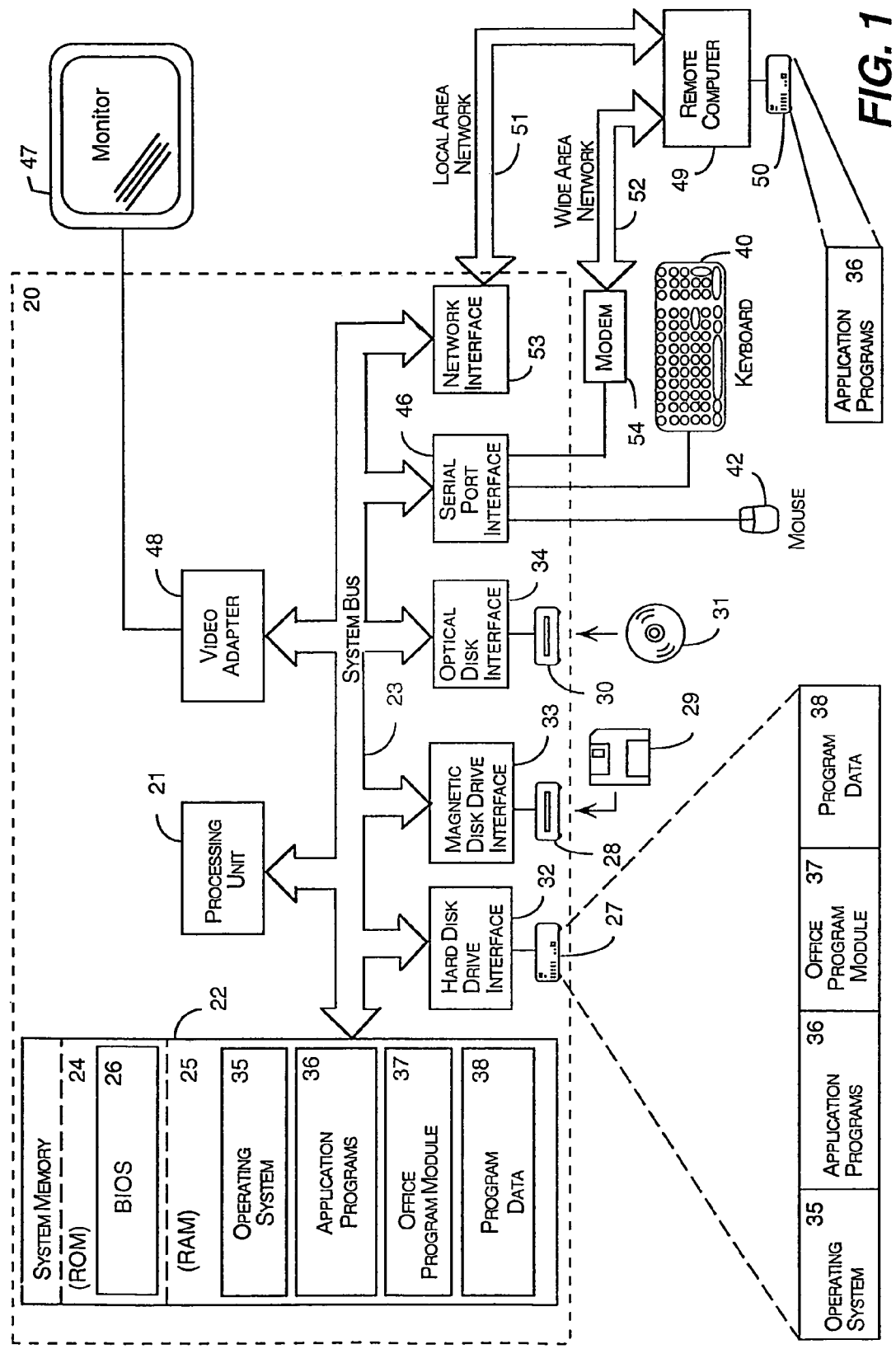
FIG. 1 is a block diagram of a computer that provides the exemplary operating environment for the present invention.

The present invention is directed to a method and system for categorizing failures of a program module. A failure may be a crash of the program module or a set-up failure during installation of the program module. Additionally, the failure may be an assert, i.e., a problem encountered during in-house testing of the program module by the program module's manufacturer. Once detected, the program failures are categorized and reported directly to a repository, such as a server operated by the manufacturer of the program that failed. The repository may also be a local file server operated by a corporation. For example, the corporate file server repository may be used to store the failures encountered by users in a corporate environment until these failures are reported to the manufacturer's server. Typically, a failure reporting executable provides communications between the failed application program module and the repository.

When there is a failure in a program module and data regarding the failure needs to be uploaded to the repository for storage and analysis, a fundamental question needs to be answered: what data is needed to effectively distinguish one failure from another and to provide enough information so that the failure may be fixed by developers? Enough data must be gathered at the program module to uniquely identify a failure, but it is impossible to send all of the information about the failure to the repository. Additionally, it is impossible for the failure reporting executable to repeatedly query the repository regarding the data to gather due to the expense in time and bandwidth. Thus, the failure reporting executable must be intelligent enough to know what information to gather for different failures. In addition to gathering the correct failure data, it is important to categorize the failure data so that similar failures are grouped together to identify failures that multiple users are experiencing.

The categorization employed by the present invention allows the failure-reporting executable to pass up a minimal amount of information to a repository for analysis. The minimal amount of information passed saves computing time and also allows an easy examination of the failure data at the repository. If it is decided that more information is needed to better understand the failure, then more data is retrieved from the application program module and uploaded to the repository as a .cab file. The categorization also allows sorting at the repository and aids the developers of the program module in understanding the frequency at which different failures are occurring.

In one embodiment, the invention is incorporated into the "OFFICE" program module, marketed by Microsoft Corporation of Redmond, Wash. Briefly described, the "OFFICE" program module is a suite of word processing, spreadsheet, presentation, database, and time management application programs along with program modules that integrate and enhance these application programs. While the invention will be described in the general context of the "OFFICE" program module running in conjunction with a personal computer, those skilled in the art will recognize that the invention also may be implemented in combination with other program modules.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, an "OFFICE" program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary System for Reporting Failures

In one embodiment, the present invention operates in conjunction with a system for reporting to a software manufacturer categorized failure data of one of its program modules. The categorized failure data is stored in a repository such as a remote server or a local corporate file server. The categorized failure data may then be analyzed by the software manufacturer's developers so that solutions and fixes to the failures may be developed.

For a more detailed description of reporting a failure than the description below, see "Method and System for Reporting a Program Failure", U.S. Pat. No. 6,629,267, issued Sep. 30, 2003, commonly assigned and incorporated by reference herein.

Figure 2:
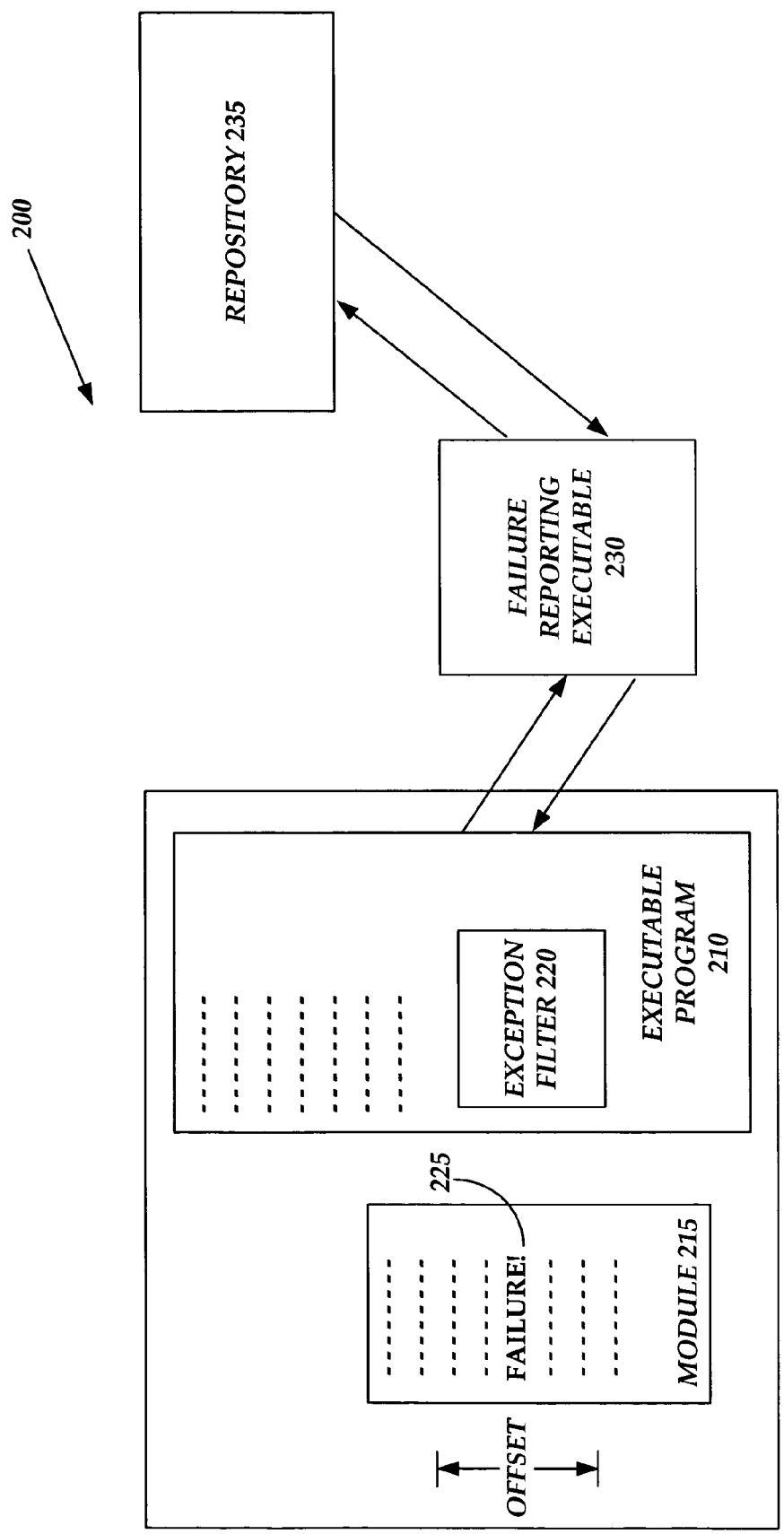
FIG. 2 is a component block diagram of an exemplary system for reporting a program failure.

Referring now to FIG. 2, a component block diagram of an exemplary system 200 for reporting a program failure will be described. The system 200 comprises an application program module 205. For example, application program module 205 may be the "WORD" word processor program module, marketed by Microsoft Corporation of Redmond, Wash. and included in the "OFFICE" 37 (FIG. 1) suite of program modules.

The system 200 further comprises an executable program 210 running inside of application program module 205. For example, in the "WORD" word processor program module, the executable program may be "WinWord.exe". An executable program is a program that can be run and typically means a compiled program translated into machine code in a format that can be loaded into memory and run by a computer's processor. The lines of code in executable program 210 are illustrated as dashed lines in FIG. 2.

The system 200 further comprises a module 215 being executed by the executable program 210 inside the application program module 205 at the time of the failure. For example, the module 215 may be a dynamic-link library such as "mso.dll". The lines of code in module 215 are illustrated as dashed lines in FIG. 2.

The system 200 also comprises an exception filter 220. Exception filters are well-known in the art and may be registered by program modules when the operating system 35 is started. When a failure (an exception) occurs, the exception filter 220 code is executed. For example, suppose a failure occurs while executable program 210 is executing instructions running module 215 at location 225. If executable program 210 has registered exception filter 220 with the operating system, then the exception filter 220 is executed when executable program 210 encounters an exception.

In the system 200, exception filter 220 executes a failure reporting executable 230. The failure reporting executable 230 is an executable program comprising all of the instructions needed to communicate between the application program module 205 and a repository 235. The communications between the failure reporting executable 230, the application program module 205 and the repository 235 are illustrated as arrows in FIG. 2. The failure reporting executable 230 is preferably separate from the application program module 205 because of the possible instability of the application program module (having experienced a failure).

The repository 235 is typically a remote server operated by the manufacturer or marketer of the application program module 205. For example, if the application program module is the "WORD" word processor program module, then the server may be operated by Microsoft Corporation of Redmond, Wash. If the repository 235 is a remote server, then the failure reporting executable 230 may communicate with it via conventional means, such as by using a web browser to connect to the server via the Internet.

In some environments, such as the corporate environment, the repository 235 may be operated locally at the corporation. For example, a corporation may not allow their employees to have Internet access or a corporation may not want their employees reporting failures directly to an outside software manufacturer (potentially divulging sensitive corporate information). In those instances, the repository 235 may be a local server. If the repository is a local corporate repository, a system administrator at the corporation will typically be tasked with periodically uploading relevant information to the software manufacturer so that the software manufacturer may correct the failures being experienced by the corporation.

When a failure in the application program module 205 occurs at location 225, the operating system 35 (FIG. 1) throws the application program module 205 out of memory and the exception filter 220 executes the failure reporting executable 230. The failure reporting executable 230 then must determine the type of failure that has occurred and determine how to categorize the failure for transmission to the repository 235. Typically, the type of failure is either a crash, a set-up failure or an assert.

Based upon the type of failure, the failure reporting executable 230 then determines what relevant information to retrieve from the application program module to uniquely identify, i.e. categorize, the failure. In many cases, uniquely identifying the failure means determining the location of the failure. Typically, the categorization, or location information, of the failure is sent to the repository as a bucket. A bucket is a set of information uniquely defining the location of the failure. If a bucket from one failure matches a bucket from another failure, then it is assumed that both failures are caused by the same bug. Although not always accurate (because more than one bug may be at the same location), this assumption that failures with the same bucket information are caused by the same bug allows for effective organization in the repository, as will be further described below.

The information in a bucket may be different depending on the type of failure (crash, set-up failure, or assert). Typically, for a crash, the following five properties are sent to the repository in a bucket:

a name of the executable module where the crash occurred;

a executable module's version number;

a name of the module containing the crashing instruction;

a module's version number; and an actual offset into the crashing module of the crashing instruction (or the address of the crashing instruction itself if the module is not known).

Typically, for a set-up failure, the following six properties are sent to the repository in a bucket:

a ProductCode of the application program module that was being installed;

a ProductVersion of the application program module that was being installed;

a LastAction that was performed during set-up before the failure;

an ErrorNumber of the failure;

ErrorFields 1, 2 and 3 which are associated and depend upon the ErrorNumber.

Crash Bucketing

As described above, in one embodiment, the information in a bucket for a crash comprises an AppName, an AppVer, a ModuleName, a ModuleVer, and an offset into that module. The AppName is the name of the executable program 210 that was executing at the time of the failure, such as "WinWord". The AppVer is the version number of the executable program 210 that was executing at the time of the failure, such as "10.1204.1.0". The ModuleName is the name of the module 215 that was executing at the time of the failure, such as "mso.dll". The ModuleVer is the version number of the module 215 that was executing at the time of the failure, such as "10.124.1". The offset is offset of the instruction pointer into the module where the failure occurred, such as "1234". The offset is illustrated in FIG. 2.

It should be understood that the location of the failure, is simply identifying information about the failure so that one failure may be distinguished from another failure. In alternative embodiments of the present invention, the location, i.e., identifying information, of the failure may comprise only a single piece of information rather than AppName, an AppVer, a ModuleName, a ModuleVer, and an offset. Conversely, in alternative embodiments, the location of the failure may comprise a plurality of data.

After the failure is categorized by determining bucket information and the bucket information is sent to the repository, the repository determines whether the bucket information of the failure matches the bucket information of any previously reported failures. This determination is helpful to determine whether the failure is a new failure (i.e., one that has not been reported before), to determine whether there is a fix for the failure, to determine whether the software developers have requested that more information be collected regarding this type of failure, etc.

The determination whether the bucket information of the failure matches the bucket information of any previously reported failures may be accomplished by comparing the bucket information of the failure to bucket entries in a crash database 300 in the repository. Two exemplary bucket entries 305, 310 for two crashes are illustrated in FIG. 3.

Referring now to FIG. 3, an illustration of an exemplary crash database and exemplary crash bucket entries in accordance with an embodiment of the present invention will be described. The crash database 300 comprises a response column 315. The response column determines what the response to the user who experienced the failure will be. For example, a "1" in the response column may mean that the user is simply thanked for submitting the failure. On the other hand, the response column might instead contain a URL outlining additional information to provide the user that experienced the failure and this information might include a fix for the failure or a way for the user to work around the failure. The data in the response column for a bucket entry is typically entered by the crash database operator.

The crash database 300 further comprises a hits column 320. The hits column is an indication of how many users have reported this bucket to the database and the data in the hits column for a bucket entry is increased by one every time matching bucket information is received by the crash database 300. Rather than entering a new bucket entry, the hits column is incremented upward by one every time matching bucket information is received. For example, every time bucket information with the same AppName, AppVer, ModuleName, ModVer and offset as bucket entry 305 is received the data in the hits column 320 is incremented upward for bucket entry 305.

The hits column 320 allows the crash database operator to determine which bucket entries are experiencing the most crashes and concentrate on fixing the bug or bugs that are causing those crashes.

The crash database 300 further comprises an AppName column 325, an AppVer column 330, a ModuleName column 335, a ModVer 340 and an offset column 345. The data in these columns corresponds to the bucket information described above. Additionally, the crash database 300 further comprises a BucketId column 370 which can be used for easier reference to existing buckets.

In certain circumstances, more data may be required by the repository for a particular failure. Thus, the crash database 300 further comprises information about what data to collect from the failed application program module and a number reflecting how many more times this information needs to be collected. This information about what data to collect and how much to collect is typically decided by the software developers of the application program module 205. For example, suppose a particular location 225 is experiencing numerous failures. In order to diagnose and correct the failure, a software developer may determine that it is important to collect certain information. However, because the particular bucket is experiencing numerous failures, it may be inefficient to collect information from every user who experiences the same failure. The database 300 may be programmed to know what information to collect from users who experience a particular failure and also how many times to collect this information.

As part of requesting and receiving the additional data, the failure reporting executable may generate a minidump. The minidump is essentially a collection of relevant information that provides an autopsy of the crashed application program module. The minidump may comprise information about the state of the process at the time the dump was collected that is helpful in understanding what caused the failure. Typically, the minidump comprises brief information about the computer (such as operating system and CPU); a list of all the threads in the process with their CONTEXTS (an operating system term describing the current state of the thread's execution on the CPU) and memory stack; a list of all modules loaded in the process and their relevant information (name, version number, where they are loaded into the process space, etc.); and the global data associated with specific modules (such as mso.dll, outllib.dll and the module containing the failure).

In addition to the minidump, the data may comprise registry keys, files, file versions, documents, and WQL queries (WMI (Windows Management Interface) Query Language). Essentially, the data may comprise any information needed from the failed application program module 205 to diagnose the failure.

In a preferred embodiment, the data is sent to the repository as .cab files or in another compressed format. .cab is used as a file extension for cabinet files which are well-known. Cabinet files are multiple files compressed into one and extractable with the extract.exe utility.

It should be understood that the data sent to the repository may be used by developers to diagnose the failure and, if possible, develop a fix for the failure.

Thus, as part of gathering this additional data, the crash database 300 further comprises a .cabs wanted column 350. The .cabs wanted column 350 comprises data regarding how many .cab files need to be collected for a bucket entry. Every time that a cab file is collected, the data in the .cabs wanted column is decreased by one. The .cabs wanted column may be changed by the crash database operator. For example, if a particular failure is being hit a lot, then the crash database operator may want to limit the number of .cab files collected because of the limitations of the database operator to examine many .cab files. In other words, the crash database operator may only be able to realistically examine ten .cab files and it would not make sense to collect hundreds of .cab files that will not be examined and which will take up memory. The location of the .cab files may be stored in the database as a separate table. Each row in the table may list a bucket number (the bucket entries are numbered and there may be multiple bucket entries with the same bucket number) and a full path to a .cab file.

There may also be another column with fields that comprise the manifest, or the information to collect in the .cab file for a particular bucket entry.

It should be understood that embodiments of the present invention may also be used during the development process of a program module. One problem encountered during the development process is that the program module is constantly being revised and different versions of the program module are being checked in periodically. In most cases, the offset (and thus the bucket) associated with a troublesome piece of code changes between versions. It is difficult to recognize that bucket entries from two different versions are actually caused by the same piece of troublesome code. In other words, every time a new build is released, it is difficult to aggregate bucket information across different builds. Thus, there is a need for a method for associating code in two different versions of a program module so that a troublesome piece of code can be identified and fixed. Otherwise, a developer may not know that two buckets from two different versions of a program module are being caused by the same bug.

To solve the problem of version changes, a program database (PDB) is used. A program database is a fileserver maintained at the repository or stored at a separate location. In the program database is all the source code for all the versions of a program module. For every single executable file, there is an associated PDB file. Periodically, the entries in the repository are cross-referenced with the program database to determine the data to be placed into two columns in the bucket entry (a symbol column and a source column). The symbol column comprises the name of the function where the failure occurred. The source column comprises the actual line of code at which the failure occurred.

Thus, as described above, the database 300 may further comprise a symbol column 355 and a source column 360.

The bucket entry also may comprise a built by column 365. The built by column 365 indicates whether the program module that experienced the failure is an official version of the software or a developer's version of the program module. In other words, the built by column 365 may indicate that the program module is an official version (either officially dropped by a tester or released to the public) or the built by column may indicate that it is a developer's version (not officially released and being edited by the developer).

It should be understood that if the bucket information for a failure does not match any previously reported buckets, then a new bucket entry is created in the crash database 300. It should also be understood that the crash database 300 described above is exemplary and does not limit the present invention to the columns and bucket information described in reference to FIG. 3. Alternative information may be entered in the database as will be obvious to those skilled in the art.

It should be understood that additional data regarding the failure may be requested and obtained by the repository as described above with regard to .cab files.

It should be understood that the failure reporting executable 230 comprises instructions to generate buckets for different types of failures and comprises instructions to gather primary data about these different types of failures. The data needed to diagnose a set-up failure may be entirely different than the data needed to diagnose a crash. For example, for a set-up failure, the failure reporting executable 230 comprises instructions to gather the set-up logs to send to the repository.

In alternative embodiments, the present invention handles all sorts of different types of failures. These failures may comprise crashes, set-up failures and asserts.

Bucketing Asserts

Asserts are well-known in the art as internal development and consistency tools used in the testing of application program modules. Assert tags are tags placed along with asserts to uniquely identify an assert. Using bucketing for assert tags, developers can use a database to track how many times a particular assert has been encountered so far during the products development. Previously, developers essentially worked in a vacuum with out knowing how many times other developers and testers were hitting particular asserts. Thus, applying the present invention to the software development process, assert tags can be tracked so that developers know what locations are experiencing the most failures during testing and development of a program module.

Bucketing Set-Up Failures

Set-up failures are failures that occur during installation of a program module, i.e., during the set-up of a program module. FIG. 4 is an illustration of an exemplary set-up failure database 400 and an exemplary set-up failure bucket entry 405 in accordance with an embodiment of the present invention.

Referring to FIG. 4, the set-up failure bucket entry 405 comprises, in one embodiment, a response column 410, a hits column 415, a ProductCode column 420, a Product Version column 425, a Last Action column 430, an ErrNumber column 435, an Err1 column 440, an Err2 column 445, an Err3 column, 447, a .cabs wanted column 450, and a bucket ID column 452. The response column 410, hits column 415, bucket ID column 452 and .cabs wanted column 450 are similar to their counterpart columns described in reference to FIG. 3. However, the .cab file for a set-up failure typically comprises a collection of set-up logs, the properties of the user's computer at the time of failure, and other specific data about the user's computer that will allow the set-up failure to be diagnosed. The primary data that is requested for a set-up failure is the content of one or more log files that may be placed into a .cab file upon request from the repository 235. Many different types of second level data may also be requested for set-up failures, with the exception of current documents.

The ProductCode is the product code of the application program module that was being installed at the time of the set-up failure. The ProductVersion is the product version of the application program module that was being installed at the time of the set-up failure. The LastAction is the final set-up action that was performed during set-up before the failure. The ErrorNumber is an internal number assigned to the failure that occurred. ErrorFields 1, 2 and 3 which are associated and depend upon the ErrorNumber. ErrorFields 1, 2 and 3 may be different types of data depending on the ErrorNumber.

After a set-up failure is fixed, it is possible to send the fix to the user in response to a bucket being received. Alternatively, the user may be sent a location, such as a website where a fix may be downloaded to the user's computer. Alternatively, before installing a program module, a set-up program may, at the user's request, search for a patch to be downloaded so that the set-up failure is fixed before it is ever encountered by the user.

CONCLUSION

It should be understood that one bucket entry may be caused by multiple bugs or that multiple bucket entries may be caused by a single bug. However, the present invention is an acceptable trade-off between the two extremes of passing all of the information regarding a failure to the repository and passing no information regarding a failure.

It should be understood that in alternative embodiments, debugging scripts may be included to walk the stack back to determine more sophisticated bucket information regarding a failure. These debugging scripts could ship with application program module or could be obtained in conversations between the failure reporting executable and the repository.

It should be understood that a developer may examine the bucket entry, including the .cab files, and re-bucket the entries at the repository. For example, seven .cab files may be similar and caused by one bug and another three .cab files may be similar and caused by a second bug. The seven bucket entries may be re-bucketed together and the three bucket entries may be re-bucketed together as separate bugs.

Although the present invention provides much information, a developer typically will need to examine the .cab files and walk the stack back to determine what bug or bugs are causing a particular failure. However, the present invention provides a good starting point in the failure analysis process.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for categorizing information regarding a crash in an application program module, the method comprising the steps of:
    determining data related to the crash in the application program module, wherein the data related to the crash in the application program module comprise:
        a name of an executable module where the crash occurred in the application program module;
        a version number of the executable module;
        a name of a module containing an instruction causing the crash;
        a version number of the module; and
        an offset into the module with the crashing instruction;
    placing the crash related data into a bucket;
    transmitting the bucket to a repository for storage;
    comparing the bucket to a bucket entry in the repository to determine whether the bucket matches the bucket entry and, if so, then increasing the hit count for the bucket entry; and
    if the bucket does not match the bucket entry in the repository, then adding the bucket as a new bucket entry in the repository.

2. The method of claim 1 further comprising the step of determining whether the repository requires additional data regarding the crash and, if so, then requesting and receiving additional data from the application program module.

3. The method of claim 2 wherein the additional data is transmitted to the repository as a .cab file.

4. The method of claim 3 wherein the additional data comprises a minidump.

5. The method of claim 4, wherein the additional data further comprises secondary data comprising a plurality of registry keys, files, file versions, documents and WQL query results.

6. The method of claim 3 further comprising the step of examining the .cab file to determine a fix for a bug that caused the crash.

7. The method of claim 3 wherein the bucket entry comprises the bucket, a response entry, and a hits entry.

8. The method of claim 7 further comprising the step of comparing the bucket to a PDB to determine a symbol entry and a source entry and adding the symbol entry and source entry to the bucket entry.

9. A computer readable medium having instructions stored thereon for causing a computer to perform a method categorizing information regarding a crash in an application program module, the method comprising the steps of:
    generating an error number for the crash;
    determining data related to the crash in the application program module;
    placing the crash related data and the error number into a bucket;
    transmitting the bucket to a repository for storage;
    comparing the bucket to a bucket entry in the repository to determine whether the bucket matches the bucket entry and, if so, then increasing the hit count for the bucket entry;
    if the bucket does not match the bucket entry in the repository, then adding the bucket as a new bucket entry in the repository; and
    determining whether the repository requires additional data regarding the crash and, if so, then requesting and receiving additional data from the application program module.

10. The computer-readable medium of claim 9 wherein the additional data is transmitted to the repository as a .cab file.

11. The computer-readable medium of claim 10 further comprising the step of examining the .cab file to determine a fix for a bug that caused the crash.

12. The computer-readable medium of claim 9 wherein the additional data comprises a minidump.

13. The computer-readable medium of claim 12, wherein the additional data further comprises secondary data comprising a plurality of registry keys, files, file versions, documents and WQL query results.

14. The computer-readable medium of claim 9 wherein the bucket entry comprises the bucket, a response entry, and a hits entry.

15. The computer-readable medium of claim 14 further comprising the step of comparing the bucket to a PDB to determine a symbol entry and a source entry and adding the symbol entry and source entry to the bucket entry.

* * * * *